June 19, 1962  D. L. HEATH  3,040,282
VALVE RESISTORS
Filed June 25, 1959

INVENTOR.
DONALD L. HEATH
BY
ATTORNEY

3,040,282
VALVE RESISTORS
Donald L. Heath, Barberton, Ohio, assignor to The Ohio Brass Company, Mansfield, Ohio, a corporation of New Jersey
Filed June 25, 1959, Ser. No. 822,791
3 Claims. (Cl. 338—21)

This invention relates to a non-linear resistor adapted for use as a valve resistor in a lightning arrester, etc. As the voltage increases across the resistor, the resistance drops so rapidly that the current flow increases more rapidly than the voltage increases.

The primary conductor in the resistor composition of this invention is silicon carbide or other crystalline carbide semi-conductor. These semi-conductors are used in the form of crystals (often called grains) as is customary in the art at the present time. Aluminum phosphate which is electrically inert, is employed as a binder.

In bonding the semi-conductor grains together, it is customary to use a binder which holds the grains in contact to provide an electro-conductive path for the flow of electric current. Various materials have been used in these binders, such as, for example, aluminum phosphate, iron oxide, etc. In firing the resistor, the firing time and temperature are regulated to prevent the grains from fusing into a solid mass and to maintain the point contact between the grains.

I have found that certain of the materials, if used in the binder, form current paths between the grains and act as linear conductors so that the non-linearity of the resistor is adversely affected. For example, iron oxide present in a resistor of this type is reduced at the firing temperature of the block, in the order of about 2200° F., and contributes markedly to the conductivity of the valve. The resistor of the present invention is relatively free of iron oxide and other linear conductors.

According to this invention, there is added to the silicon carbide or other carbide semi-conductor, prior to firing, tin oxide or other tin compound which reacts with the carbide on firing to form tin silicide which becomes a component of the bond between the grains. Ordinarily, substantially one-half percent to ten percent of tin (calculated as the oxide) is used. The tin compound reacts with the silicon carbide to produce crystalline tin silicide which provides improved follow-current capacity. Care is taken not to employ so much as to cause the entire block to become fused. The tin compounds which can be used include, in addition to $SnO_2$, various ores and other oxides, sulfates and phosphates, etc.

The valve block is made by mixing 50 to 80 parts of silicon carbide or other crystalline semi-conductor with 5 to 35 parts of aluminum phosphate (which may be added as aluminum oxide plus phosphoric acid or aluminum phosphate) and including no more than 5 percent $Fe_2O_3$; and 0.5 to 10 percent stannic oxide or other compound which on firing produces tin silicide.

Representative formulae (in which the amounts of the materials added to the silicon carbide are given as approximate percentages of the oxide equivalents) follow:

Formula I 50 to 80% SiC
5 to 35% $Al_2O_3$
0.5 to 10% $SnO_2$

Formula II 50 to 80% SiC
1.2 to 5% $Fe_2O_3$
5 to 35% $Al_2O_3$
0.5 to 10% $SnO_2$ Phosphoric acid or a reactive phosphate is added to the mixture to convert at least a substantial part of the aluminum oxide to phosphate, as is customary in the art. The amount of phosphoric acid may be varied as, for example, from 2 to 6 percent. (The foregoing percentages refer to parts by weight, based on the weight of the total weight of the materials employed.)

Electrical grade silicon carbide is ordinarily employed because it contains certain impurities which give it a desired non-linear conductivity. Any of the crystal sizes ordinarily employed in resistors may be used, ranging from about 35 to 240 mesh.

To produce a valve resistor containing tin compound, the following procedure has been found satisfactory. The silicon carbide is weighed into a mixer. The aluminum oxide and tin compound are then weighed into the mixer together with any iron oxide or other iron compound that is employed. Minor amounts of other additives may be utilized, as is common in the industry, including ball clay, china clay, talc, wollastonite, flint, feldspar, and other ceramic materials. The ingredients are mixed dry. Then concentrated phosphoric acid (85%) is added in an amount equal to about 4 percent by weight of $H_3PO_4$ based on the weight of the dry mixture. The resulting mix is pressed into valve form in a steel die using 2500 to 5000 p.s.i. for example, 3500 p.s.i., or the mixture is extruded to form resistors. These operations are known in the art. The mixture is then dried by heating, for example, to about 350° F. The product is then fired in an inert or reducing atmosphere (e.g. nitrogen, carbon dioxide, carbon monoxide, hydrogen, helium, argon, superheated steam, etc.) to about 2200 to 2400° F. to bring about the reaction with the tin, stabilize the phosphates, and produce the bond around the grains. The resistor is then subjected to a surge current which produces a path for the flow of current between the adjacent portions of contiguous grains, as is customary in the art, and in the resulting product it is customary to refer to the crystals as being in point contact.

The resulting product may be used in a lightning arrester or wherever resistors are employed. Such uses are suggested in the drawings, in which—

Figure 1:
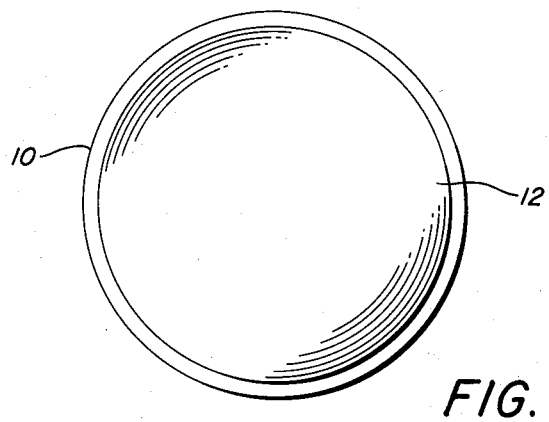
FIG. 1 is a plan view of a valve resistor for a lightning arrester.
Figure 2:
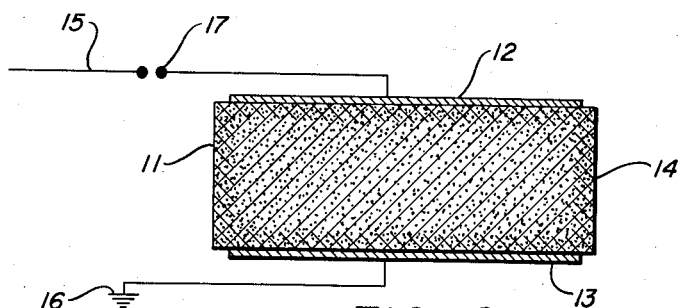
FIG. 2 is a vertical sectional view of the valve resistor of FIG. 1 with a schematic diagram illustrating the employment of the resistor with a series spark gap in a power circuit.

The valve resistor 10, illustrated in FIGS. 1 and 2, comprises a cylindrical body 11 having two metallic terminals 12 and 13 disposed substantially over the ends of the body. The terminals 12 and 13 are formed as metalized layers on the surfaces of the body or as circular plates bonded to the body during firing. One or more of the valve resistors are included in a lightning arrester and are connected in series with a gap 17 between a line 15 and a ground 16, as shown in FIG. 2.

In the arrangement of FIG. 2 the series gap 17 effectively isolates the line 15 from ground until such time as a voltage surge or other transient causes the gap 17 to arc-over. Current then flows from the line 15 through the gap 17 and the valve resistor 10 to ground 16 and continues for the duration of the surge. The current which flows during the period immediately following the termination of the surge or transient which initiates the arc-over of the gap 17 is designated as the follow current and is produced by the line voltage impressed upon the valve resistor 10 between the line 15 and ground 16.

Due to the non-linear characteristics of the valve resistor 10, the decrease in current through the resistor following the termination of the surge discharge results in an effective increase in the resistance of the block. Accordingly, the voltage across the arc gap 17 is reduced and the arc in the gap 17 is extinguished, thus interrupting the circuit between the line and ground. Obviously the more rapid the increase in resistance of the valve resistor with change in current magnitude, the more rapidly the gap 17 will be extinguished. The parameter used to designate this characteristic of the resistor is termed the exponent, from the slope of the current-voltage curve.

Valve resistors constructed in accordance with the invention display a voltage exponent of from 7 to 9 in the follow current region, whereas valve resistors constructed according to the prior art have a voltage exponent of 4 to 5 in the follow current region.

The total resistance between the terminals 12 and 13 of the valve resistor 10 at a given current is, of course, an element in the design of the resistor for any particular device or installation. The utilization of tin compounds in the practice of the present invention, as set forth above, permits the control of resistance magnitude while substantially retaining the favorable exponent characteristics.

Another characteristic of the valve resistor determining its usefulness in lightning arresters relates to the durability of the resistor when subjected to long duration current discharges. The valve resistor of the invention displays greatly improved characteristics in this respect; for example, a valve resistor according to the prior art would withstand a long duration discharge of twice its follow current rating, whereas the valve resistor of the invention would withstand long duration square wave discharges of three to four times the follow current rating.

Figure 3:
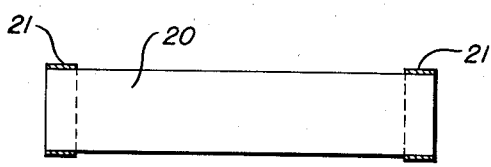
FIG. 3 is a side view of another non-linear resistor.
Figure 4:
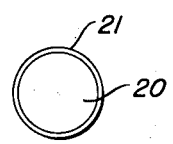
FIG. 4 is an end view of the resistor of FIG. 3.

In FIGS. 3 and 4 the non-linear resistor 20 includes an extruded cylindrical body having terminals 21 at the ends thereof. The terminals 21 may be formed as metalized layers on the exterior of the surface of the body or as cylindrical metallic pieces bonded to the body during firing. The resistor 20 is particularly useful in grading or control arrangements where severe space and/or thermal limitations exist.

The invention is covered in the claims which follow:

What I claim is:

1. The method of producing a resistor which comprises mixing 50 to 80 percent of silicon carbide; 5 to 35 percent aluminum containing material of the class consisting of (1) aluminum phosphate, (2) aluminum oxide and phosphoric acid, and (3) aluminum oxide and reactive phosphate; and 0.5 to 10 percent of a flux composed essentially of stannic oxide and then pressing the mixture into a block and firing to 2200 to 2400° F.

2. The method of claim 1 in which 0.5 to 5 percent of iron oxide is added to the composition.

3. A non-linear resistor comprising a body constituted of a mass of silicon carbide grains in which adjacent grains are in point contact throughout the block, and a ceramic bond is present over and between the grains and around said points of contact, said bond comprising aluminum phosphate and an amount of stannic silicide equivalent to 10 percent stannic oxide based on the weight of said body; and there are metallic terminals on the said body in electro-conductive engagement with the grains thereof.

References Cited in the file of this patent

UNITED STATES PATENTS

| | | |
|---|---|---|
| 2,000,719 | Slepian et al. | May 7, 1935 |
| 2,276,732 | Ludwig et al. | Mar. 17, 1942 |
| 2,445,296 | Wejnarth | July 13, 1948 |
| 2,589,157 | Stalhane | Mar. 11, 1952 |
| 2,806,005 | White | Sept. 10, 1957 |
| 2,888,406 | Bondley | May 26, 1959 |